Figure 1:
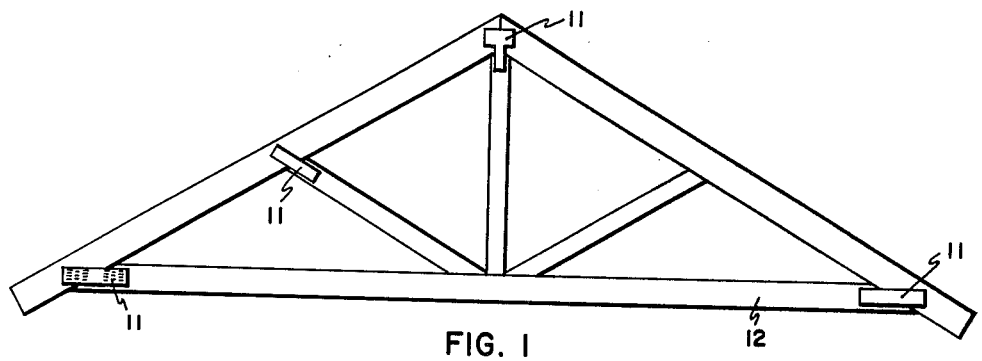

Dec. 28, 1965

C. R. COUCH 3,225,643

GUSSET PLATE FOR TRUSS SYSTEMS

Filed March 11, 1963

INVENTOR.
CLAUDE R. COUCH

BY *Bessenger*

ATTORNEY

United States Patent Office 3,225,643
Patented Dec. 28, 1965

3,225,643
GUSSET PLATE FOR TRUSS SYSTEMS
Claude R. Couch, 2414 Newland St., Edgewater, Colo.
Filed Mar. 11, 1963, Ser. No. 264,188
1 Claim. (Cl. 85—13)

The present invention relates to the fabrication of wood trusses for home building and commercial uses, and more particularly to the reinforcing or gusset plates used in such construction.

The particular type of gusset plates of present concern are those in which fastener members or nail like protrusions are struck from the plate itself and are disposed in normal relation to the plate to be driven or pressed into the wood members of the truss system. The engagement between fastener members and truss elements holds the members together in secure bond whereby the strength of the truss members is fully developed and the added tensile strength of the gusset plate supplements such strength. Recently different designs for such integral fastener and reinforcing gusset plates have been derived and are now in widespread usage.

It is an object of the present invention to provide an improved type of integral gusset plate which may be used in the same manner as prior developments and which may be substituted for prior gusset plate devices without modification of presently used plate application machinery.

Another object of the present invention is to provide a gusset plate having integral die formed fastener members of novel shape and design whereby the holding forces developed in an applied plate are substantially greater than those developed though use of conventional types of struck fasteners.

A further general object of this invention is to provide a gusset plate of novel pattern and design which will efficiently develop greater holding power when used in wood truss structures whereby the strength characteristics of such trusses may be improved.

A specific object of the present invention is to provide a plate which has fastener elements struck from the plate that are of novel split shank design.

Another object of this invention is to provide gusset plates having integral fastener members that will bend and deform as they are applied to the structural member to develop an increased fastener holding power in such member.

A further object of this invention is to provide a gusset plate of improved design which may be applied in conventional manner through use of presently developed gusset plate roll press and reciprocating press machinery.

A specific object of the present invention is to provide a gusset plate having fastener members struck from the surface of the plate and disposed in normal relation thereto for application to structural members and in which the fastener members are of novel design incorporating split shank and shaped structural faces to provide directional drive characteristics for said fasteners.

Figure 2:
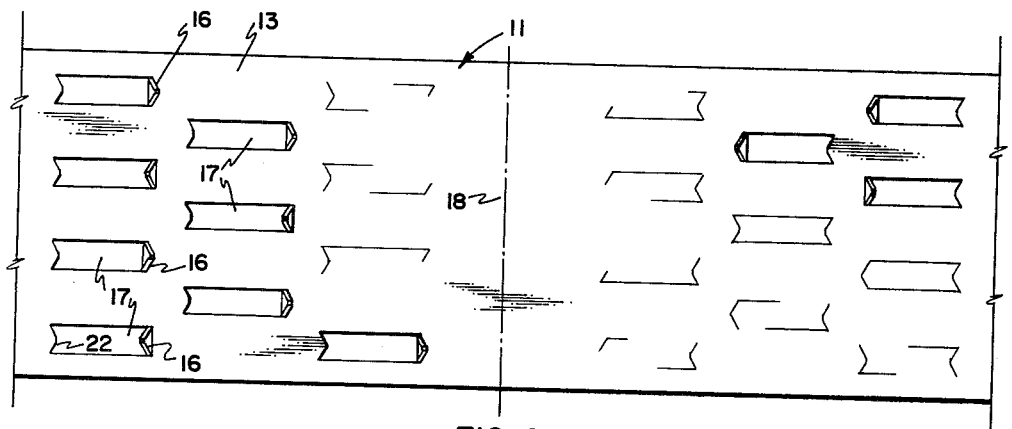
Figure 3:
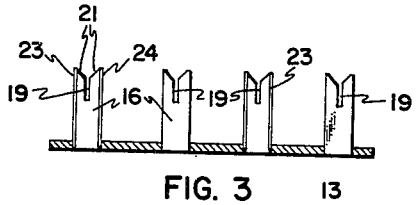
Figure 4:
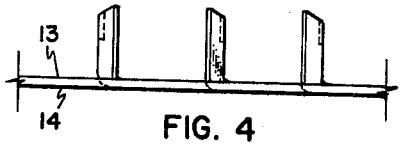
Figure 5:
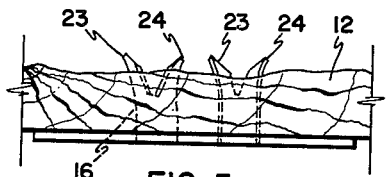
Figure 6:
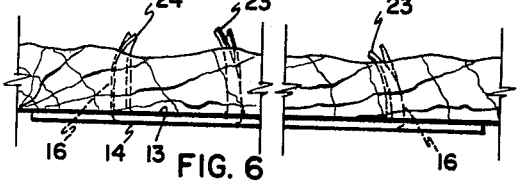
Figure 7:
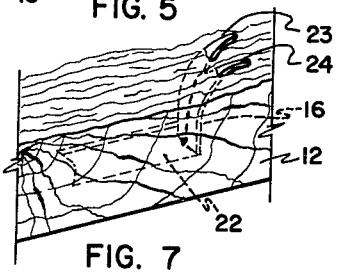

Other objects and advantages of the present invention will be apparent from the appended description and drawings, in which FIG. 1 is an elevation illustrating the type of truss system fabricated in accordance with this invention, FIG. 2 is a layout plan showing the pattern arrangement of fastener elements as struck from the surface of a typical gusset plate, FIG. 3 is an end elevation showing the alternate directionally bent features of adjacent fastener elements, FIG. 4 is a side elevation likewise illustrating the echelon positioning and the alternate bending patterns for the rows of fastener elements, FIG. 5 is an end elevation in partial section taken through a wood member to which a gusset plate has been applied and illustrating the bent shape of applied fastener elements, FIG. 6 is a similar side elevation showing further details of the bent configuration of the fastener elements, and FIG. 7 is a perspective drawing illustrating the holding features of an applied fastener element.

Briefly stated, the present invention provides a gusset plate for use in structural trusses and the like. The particular gusset plate described herein is of a design providing a plurality of fastener elements that are struck in patterned arrangement from the flat gusset plate and are bent to an initial position normal to the surface of such plate. The design of the separate fastener elements is of importance in the present invention, since each fastener element, in its ready-for-use position, incorporates distinctive prebent and preshaped features. These features include a split shank so the separated points tend to diverge and bend when the plate and fasteners are applied to a structural member. The fastener elements are further bent and shaped prior to application of the plates so the direction of shank bending may be regulated. The bent and shaped pattern of the fastener elements tends to develop greater holding forces between the plates and structural members whereby the assembled trusses may withstand increased loads.

The features of a specific embodiment of the invention are shown in the accompanying figures. FIGURES 2, 3 and 4 illustrate the pattern and shaped arrangement of a gusset plate and its fastener elements prior to the application of the gusset plate to a structural member. FIGURES 5, 6 and 7 show the configuration of the fastener elements after the gusset plate has been applied to a wood structural member. In all of the figures and illustrations the separate gusset plates are identified by the numeral 11, while wood structural members are indicated by the numeral 12. These wood structural members may be incorporated into a framed truss as shown in FIGURE 1 by the application of a plurality of gusset plates in opposed positions on the side surfaces of the structural members at each of the joints between the cooperatively formed wood structural members 12.

As illustrated in FIGURE 1, the gusset plates 11 themselves may be of different configurations and designs as necessary to securely hold the structural members in their designed working truss arrangement. A simple rectangular gusset plate 11 is universally used in most wood truss framing systems. Such a simple plate is shown in FIGURE 2 and may be used to illustrate features of the present invention. In this view the surface or face 13 of the gusset plate 11 which is to be brought into contact with a wood structural member is disposed upwardly toward the viewer. The back 14 of the plate 11 against which pressure is applied to position the plate cannot be seen.

Through use of punch press operations a plurality of fastener elements 16 are cut and separated from the gusset plate 11 to leave a plurality of spaced openings 17 in such surface. The material removed from such openings is by similar punch operations bent upwardly to a position that is at right angles or normal to the plane of the gusset plate face 13. On completion of the forming operations a plurality of fastener elements 16 are disposed in side-by-side echelon pattern standing above the face 13.

In the usual gusset plate 11 the fastener elements 16 will be disposed in patterned or symmetrical arrangement on opposite sides of a center line 18 or of a similar dividing line which will usually conform to the line of contact between the abutting structural or truss members to which the plate is to be applied. In the gusset plate illustrated, the center line 18 is a line of symmetry, and it will be seen that the fastener elements 16 are disposed in ordered arrangement on opposite sides of such line. The holes 17 are outboard with respect to such line and with respect to each of the fastener elements 16 raised from such hole or opening. With this arrangement the holding pattern or holding forces applied by the fastener elements should be symmetrical at each end of the gusset plate.

Another structural feature incorporated in the gusset plate illustrated is derived from the fact that while the fastener elements are disposed in echelon rows, the individual fastener elements of adjacent rows are in staggered relationship each to each. This feature helps to maintain the structural and tensile strength of the gusset plate, and further improves the disposition pattern of the fastener elements in a wood type structural member so that any tendency to split the wood along its grain will be minimized.

A further structural feature of the present invention is inherent in the fact that each of the adjacent fastener elements in any echelon row is bent differently than its neighbor. Thus, reading from top to bottom in the front row on the left illustrated in FIGURE 2, the fastener elements 16 are bent first so that a formed V groove faces outwardly, next inwardly, next outwardly, and next inwardly with respect to the center line 18 of the gusset plate 11. This pattern is symmetrically duplicated in the last echelon row to the right.

In addition to the directional prebending of the fastener elements, each of the separate fastener elements is provided with a split shank through a portion of its height. This split shank is derived by cutting or slitting the fastener element 16 to provide a slot 19 in position corresponding to the intersection of the V groove.

A further feature in the design of each of the fastener elements 16 is embodied in the provision of outwardly sloping or tapered end surfaces 21. These tapered end surfaces are formed as the fastener element 16 is struck from the opening 17 leaving a nib 22. The tapered end surfaces 21, the slots 19 and the prebent and alternating V shapes guide the separate left and right tines 23 and 24 of each fastener element along a preferably divergent bending pattern as the gusset plate and its fastener elements are driven or moved into a structural member.

The bent pattern for the applied fastener elements 16 is illustrated in FIGURES 5, 6 and 7. In FIGURE 5 the fastener element 16 on the left, which corresponds to the element 16 shown directly above it in FIGURE 3, has its separate tines 23 and 24 bent toward the viewer as it passes into the wood member 12. In the next adjacent fastener element 16 the tines 23 and 24 are bent away from the viewer. In both instances the direction of bend corresponds to the trough side of the preshaped V bend.

Application of gusset plates made in accordance with the present invention indicates that the described configuration for the gusset plate and the fastener elements themselves will provide a novel and distinctive bending pattern for such fastener elements when the gusset plate is applied to wood or similar structural members. In straight grain materials it is noted that the tines bend laterally outwardly with a corresponding widening of the slot 19, and at the same time the tines are bent longitudinally toward the trough side of the bent V. Necessarily, the particular bending pattern is subject to irregularity and disruption when woods of widely variable grain hardness are encountered. The overall pattern, however, in any particular wood structure will substantially conform to a desired configuration. Whether fully or only partially conformed, it is noted that the bent configuration of the separate tines develops a considerably greater holding power for such elements in the wood structure.

This greater holding power maintains the gusset plate 11 in position with the face 13 tightly against the truss members when the trusses are subjected to considerably greater loadings. Inasmuch as loading tests of truss systems indicate that a common type of failure starts first by a loosening of the gusset plate fastener elements, any improved fastener holding power represents a distinct advantage. The present improvement satisfies the stated objectives by more efficiently developing the individual strength characteristics of the metal gusset plate and of the wood structural members so that the combined strength of such individual members will be improved.

It should be further observed that the gusset plates 11 described may be applied to truss elements in conventional manner. After prepositioning, the fastener members may be driven into the structural elements by roll or reciprocal presses or by hand.

Several advantages of the present construction become apparent in the use of the plates with conventional plate driving equipment. It is noted that the V trough bending of the separate fastener elements 16 adds strength and rigidity to such elements. This increased strength and rigidity helps the fastener elements to penetrate the wood structural members, and accordingly the full length of the fastener elements 16, inclusive of the tines 23 and 24, is driven into contact relation with the wood members.

Necessarily, the prebent and preshaped form of the fastener elements may be used in connection with other styles and designs of gusset plates as necessary to more securely hold structural members disposed at an angle one to the other. The same improved characteristics will be evident in all such modifications.

While separate embodiments of the invention have been shown and described, it is obvious that features of this invention are adaptable to various modifications and changes. All such modifications as come within the scope of the hereunto appended claim are considered to be a part of this invention.

I claim:

An integral fastener and reinforcing plate unit adapted for holding structural members together when said unit is applied as by driving or pressing said unit into said structural members comprising a sheet of material, a plurality of fastener elements struck in row pattern from said sheet material forming a plurality of elongated openings therein with the free end of said elements raised to a position normal with respect to said sheet material, the center line of the plate defining a line of symmetry wherein said elongated openings extend away from the center line on each side thereof with the fastener elements being connected to the plate at the end of the openings nearer said line, said fastener elements being bent along the vertical length thereof to provide V grooves adapted to reinforce, guide and strengthen said normally disposed fastener elements with the V grooves of adjacent fastener elements in a row being disposed in opposite direction, each of said fastener elements being slotted along a portion of its length at the free end thereof to provide a pair of penetrating points, and guide faces on the contact edges of said points converging in a direction toward the plate from the tips of said points to the slot for cooperative coaction with said directional V grooves for biasing said individual penetrating points in independent directions as the plate unit is applied to said structural members whereby the total holding power of said fastener elements and plate unit is increased.

References Cited by the Examiner

UNITED STATES PATENTS

| | | | |
|---|---|---|---|
| 2,293,862 | 8/1942 | Sorenson | 85—13 |
| 2,433,914 | 1/1948 | Lang | 85—17 |
| 2,877,520 | 3/1959 | Jureit | 85—11 |
| 3,016,586 | 1/1962 | Atkins | 85—13 |

CARL W. TOMLIN, *Primary Examiner.*

EDWARD C. ALLEN, *Examiner.*